US011119680B2

(12) United States Patent
Hsu

(10) Patent No.: US 11,119,680 B2
(45) Date of Patent: Sep. 14, 2021

(54) DATA WRITING METHOD OF FLASK DISK ARRAY BASED ON RESIDUAL LIVES OF FLASH DRIVES THEREOF

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

(*) Notice: Subject to any disclaimer, the term of this patent is extended or adjusted under 35 U.S.C. 154(b) by 0 days.

(21) Appl. No.: 16/850,894

(22) Filed: Apr. 16, 2020

(65) Prior Publication Data

US 2020/0333959 A1 Oct. 22, 2020

(30) Foreign Application Priority Data

Apr. 17, 2019 (TW) ................................. 108113340

(51) Int. Cl.
*G06F 3/06* (2006.01)

(52) U.S. Cl.
CPC ............ *G06F 3/064* (2013.01); *G06F 3/0604* (2013.01); *G06F 3/0631* (2013.01); *G06F 3/0632* (2013.01); *G06F 3/0659* (2013.01); *G06F 3/0688* (2013.01)

(58) Field of Classification Search
CPC .... G06F 3/0604; G06F 3/0616; G06F 3/0631; G06F 3/0632; G06F 3/064; G06F 3/0659; G06F 3/0688; G06F 11/10; G06F 12/02
See application file for complete search history.

(56) References Cited

U.S. PATENT DOCUMENTS

| 2011/0131368 A1* | 6/2011 | Lee ...................... G11C 16/349 711/103 |
| 2016/0179410 A1* | 6/2016 | Haas ................... G06F 12/0873 714/6.24 |
| 2016/0179678 A1* | 6/2016 | Camp ................. G06F 12/0855 711/103 |

* cited by examiner

*Primary Examiner* — Larry T MacKall
(74) *Attorney, Agent, or Firm* — WPAT, PC

(57) ABSTRACT

A data writing method of a flash disk array is provided. The data writing method includes steps of: obtaining a first data quantity; receiving intermediate data to be written into the flash disk array; comparing a second data quantity of the intermediate data with the first data quantity; and writing the intermediate data into the flash disk array when the second data quantity is not less than the first data quantity. At most one data block is allocated from each of flash drives. Some of the allocated data blocks are written with the intermediate data, while others of the allocated data blocks are not written with the intermediate data and provided as reserved blocks. The number of the reserved blocks has at least two selectable values dependent on residual lives of the flash drives.

10 Claims, 4 Drawing Sheets

| Flash drive # \ Data block # | B1 | B2 | B3 | B4 |
|---|---|---|---|---|
| 110_1 | D | | | |
| 110_2 | D | | | |
| 110_3 | D | | | |
| 110_4 | D | | | |
| 110_5 | P(P1) | | | |

FIG. 3A

| Flash drive # \ Data block # | B1 | B2 | B3 | B4 |
|---|---|---|---|---|
| 110_1 | D | | | |
| 110_2 | | D | | |
| 110_3 | | | | D |
| 110_4 | | D | | |
| 110_5 | | | | P(P1) |

FIG. 3B

| Flash drive # \ Data block # | B1 | B2 | B3 | B4 |
|---|---|---|---|---|
| 110_1 | D | | | |
| 110_2 | D | | | |
| 110_3 | ✗ | | | |
| 110_4 | D | | | |
| 110_5 | P(P1) | | | |

FIG. 3C

| Flash drive # \ Data block # | B1 | B2 | B3 | B4 |
|---|---|---|---|---|
| 110_1 | D | | | |
| 110_2 | | D | | |
| 110_3 | | | ✗ | |
| 110_4 | | ✗ | | |
| 110_5 | | | P(P1) | |

FIG. 3D

DATA WRITING METHOD OF FLASK DISK ARRAY BASED ON RESIDUAL LIVES OF FLASH DRIVES THEREOF

FIELD OF THE INVENTION

The present disclosure relates to a flash disk array, and particularly to a data writing method of a flash disk array.

BACKGROUND OF THE INVENTION

Flash drives which adopt flash memories as storage media have become widely used data storage devices recently. The flash drives have the advantage of high data access speed and have high performance in a disk array with huge data input and output.

Any erase block of a flash memory has a finite number of program-erase cycles (typically written as P/E cycles). Therefore, in a data writing process, the flash memory usually uses wear leveling technology to dynamically remap the erase blocks in order to spread write operations between sectors during a certain of time period to average the program-erase cycles of the erase blocks to the greatest extent possible. The total data storage quantity of a flash memory has an upper limit over the service life. After being written with data exceeding the upper limit, the erase blocks are probably worn out and access failure of the flash memory occurs.

As the name suggests, a flash disk array is a disk array which is composed of flash drives. In a certain type of disk arrays, when errors in one of the disks are detected, data stored in other disks are taken to recover the data of the damaged disk. Therefore, the other disks should maintain and guarantee normal operation before the data recovery completes. However, according to the wear leveling technology, the other disks with the same type and integrated in a signal logic unit are probably worn out successively within a short time. Therefore, there could be not enough time to complete the data backup or data recovery based on fault-tolerant algorithm so as to cause permanent data corruption.

In view of this, it is desired to develop a mechanism to prevent the disks from being worn out successively within a short time.

SUMMARY OF THE INVENTION

An aspect of the present disclosure provides a data writing method of a flash disk array which includes flash drives. The data writing method includes steps of: obtaining a first data quantity; receiving intermediate data to be written into the flash disk array; comparing a second data quantity of the intermediate data with the first data quantity; and writing the intermediate data into the flash disk array when the second data quantity is not less than the first data quantity. Each of N flash drives allocates at most one data block to provide M allocated data blocks collectively, wherein N and M are positive integers and M is not greater than N. Q actually-used data blocks are selected from the M allocated data blocks according to a predetermined rule based on adjusting residual lives of the N flash drives, wherein (M-Q) data blocks of the M allocated data blocks other than the Q actually-used data blocks are reserved blocks, Q is a positive integer and Q is not greater than M. The Q actually-used data blocks are collectively written with the intermediate data while the reserved blocks are not written with the intermediate data. Q has at least two selectable values.

In an embodiment, M is determined according to a RAID level of the flash disk array.

In an embodiment, the intermediate data includes application data and a check code or mirror data of the application data.

In an embodiment, the M allocated data blocks are selected from the N flash drives to adjust differences between the residual lives of the flash drives.

In an embodiment, the data writing method further includes a step of recording information related to the Q actually-used data blocks, the reserved blocks and a data storage sequence of the intermediate data after writing the intermediate data into the flash disk array.

In an embodiment, the data writing method further includes a step of receiving more intermediate data till the second data quantity of the intermediate data is not less than the first data quantity.

In an embodiment, the predetermined rule is in a form of a formula, a program, firmware linked to hardware or a set of data.

In an embodiment, the data writing method further includes a step of tracking the residual lives of the flash drives wherein the Q actually-used data blocks are selected from the M allocated data blocks according to the tracked residual lives.

In an embodiment, the data writing method further includes a step of obtaining parameters related to the residual lives of the flash drives at an initialization procedure wherein the Q actually-used data blocks are selected from the M allocated data blocks according to the parameters.

BRIEF DESCRIPTION OF THE DRAWINGS

The advantages of the present disclosure will become more readily apparent to those ordinarily skilled in the art after reviewing the following detailed description and accompanying drawings, in which:

FIGS. 3A-3D are schematic diagrams illustrating usage of the data blocks of the flash drives according to embodiments of the data writing method of the present disclosure.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
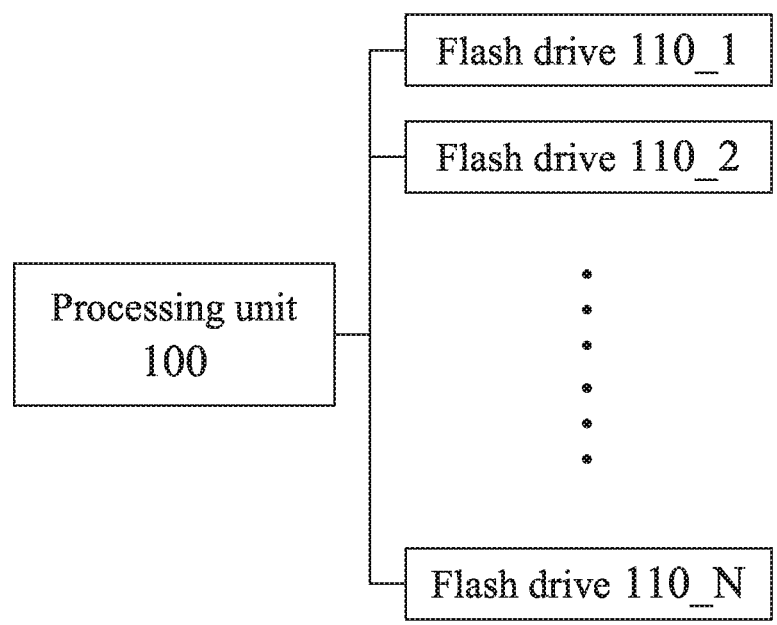
FIG. 1 is a block diagram illustrating a flash disk array used with a data writing method according to an embodiment of the present disclosure.

Please refer to FIG. 1, which is a block diagram illustrating a flash disk array used with a data writing method according to an embodiment of the present disclosure. The flash disk array 10 includes a processing unit 100 and N flash drives 110_1, 110_2 . . . 110_N respectively electrically coupled to the processing unit 100. The processing unit 100 is configured to execute any program or instruction described in the present disclosure and control the N flash drives 110_1, 110_2 . . . 110_N through respective electrical connection to change data in the designated flash drives or read data from the designated flash drives.

Figure 2:
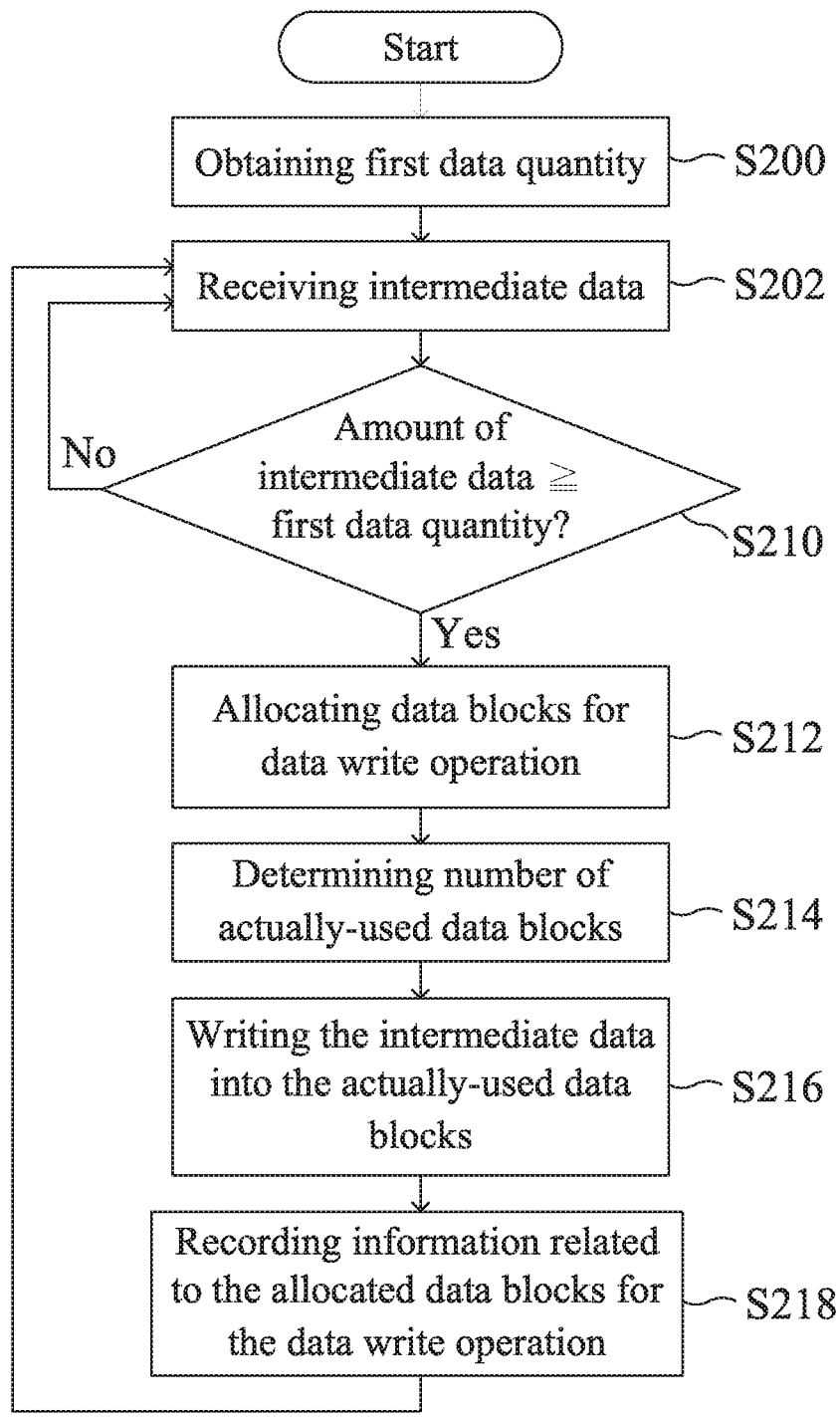
FIG. 2 is a flowchart illustrating the data writing method of the present disclosure.

Now please refer to both FIG. 1 and FIG. 2 to realize the data writing method of the flash disk array, wherein FIG. 2 is a flowchart illustrating the data writing method of the present disclosure. In this embodiment, after the startup of the flash disk array 10, the processing unit 100 obtains a proper data quantity threshold of the data to be written into the flash disk array 10 at first wherein the proper data quantity threshold is called a first data quantity hereinafter (step S200). The first data quantity represents the minimum amount of data required for a single data write operation to write data into the flash disk array 10. Since the data are dynamically and evenly distributed across the erase blocks to the greatest extent possible, the limitation of the minimum data quantity for each data write operation can prevent from frequent erase operation after writing just a small amount of data which unfortunately shortens service life of great unused space.

After obtaining the first data quantity, the processing unit 100 integrates the previously received and temporarily stored data into intermediate data to be written into the flash disk array 10 (step S202). Subsequently, if the amount of the intermediate data, i.e. a second data quantity, is less than the first data quantity (determination step S210), the method goes back to step S202 to integrate and obtain intermediate data with more data quantity. Otherwise, if the amount of the intermediate data, i.e. the second data quantity, is not less than the first data quantity (determination step S210), the processing unit 100 allocates at most one data block from every flash drive 110_1, 110_2 . . . 110_N ready for this one-time data write operation (step S212).

Concretely, as shown in FIG. 1, the flash disk array 10 includes N flash drives 110_1, 110_2 . . . 110_N, and up to one data block is selected from each of the flash drives 110_1, 110_2 . . . 110_N to provide M allocated data blocks in total. In other words, several flash drives contribute just one allocated data block respectively, and other flash drives do not contribute any allocated data block for this one-time data write operation. Hence, the value M is smaller than or equal to the value N. For a specific data write operation to the flash disk array 10, the values N and M are positive integers. At this time, the value M is selected to meet real requirements. For example, the value M could be determined according to the redundant array of independent disks (RAID) level. Concerning a flash disk array 10 of RAID 5, at least three allocated data blocks selected from different flash drives are required, and the value M is not less than 3 and up to the total number of the flash drives (i.e. value N). In addition, if the selected value M is greater than the minimum required number of the data blocks (e.g. M>3 for RAID 5), the difference between the residual lives of the flash drives could be taken into consideration to select the allocated data blocks.

Now referring back to FIG. 2, after allocating the data blocks for storing the intermediate data in step S212, the processing unit 100 determines the number of the actually-used data blocks to be written with the intermediate data (step S214).

In particular, after allocating the M data blocks in step S212, the processing unit 100 determines which of the M allocated data blocks are selected as the actually-used data blocks which will be written with the intermediate data indeed (step S214), for example, Q actually-used data blocks in total. For a specific data write operation to the flash drive array 10, the value Q is a positive integer, and is less than or equal to the value M.

After determining the value Q, i.e. the number of the actually-used data blocks, in step S214, the intermediate data are written into the Q actually-used data blocks (step S216).

The processing unit 100 may determine the Q actually-used data blocks, from the M data blocks, to be written with the intermediate data according to a predetermined rule based on the difference between the residual lives of the flash drives. The predetermined rule could be in the form of a formula, a program, firmware linked to hardware or a set of data (e.g. lookup table). Thus, the processing unit 100 can select the Q actually-used data blocks from the M allocated data blocks by applying the formula, executing the program or searching the data based on individual residual life of each flash drive 110_1, 110_2 . . . 110_N.

It is to be noted that during this data write operation, the intermediate data are not written into the (M-Q) allocated data blocks. The data previously stored in the (M-Q) allocated data blocks are kept unchanged. These (M-Q) allocated data blocks which are not subjected to the data write operation are called reserved blocks in the specification.

By selecting reserved blocks from different flash drives at different data write operations, the difference between the residual lives of the flash drives is changed and adjustable. Therefore, it prevents the flash drives from being worn out successively within a short time. Furthermore, by selecting different numbers of flash drives to provide the reserved blocks at different data write operations, the residual life difference between the flash drives could be adjusted to achieve specific residual life distribution more efficiently and flexibly. In other words, the value (M-Q) has at least two selectable values.

An example is given below to follow the steps of the data writing method of the flash disk array according to the present disclosure.

Please refer to FIGS. 3A-3D, which are schematic diagrams illustrating usage of the data blocks of the flash drives according to embodiments of the data writing method of the present disclosure. The flash disk array 10 includes at least five flash drives, and the minimum of the value N is 5. For focusing on the usage of the data blocks, only five flash drives 110_1, 110_2, 110_3, 110_4 and 110_5 and four data blocks B1, B2, B3 and B4 of each flash drive are shown.

In FIG. 3A, the values M and Q are equal to 5. The processing unit 100 may write data into any one data block allocated from the flash drives 110_1, 110_2, 110_3, 110_4 and 110_5. At this time, the processing unit 100 determines the first data quantity which should not be less than the minimum capacity among the data blocks B1, B2, B3 and B4 of the flash drives 110_1, 110_2, 110_3, 110_4 and 110_5. When the amount of the intermediate data, i.e. the second data quantity, is greater than or equal to the capacity of the smallest data block, the processing unit 100 can start to write the intermediate data into the flash disk array 10.

In the embodiment, the intermediate data include application data D and a check code P. The check code P could be any known scheme used for error detection or data recovery. For example, the check code P could be parity P1, checksum or other similar variation. In this embodiment, the processing unit 100 writes the application data D into the data blocks B1 of the flash drives 110_1, 110_2, 110_3 and 110_4, and writes the parity P1 into the data block B1 of the flash drive 110_5.

According to the definition, the combination of the data blocks B1 of the flash drives 110_1, 110_2, 110_3, 110_4 and 110_5 allocated for this one-time data write operation is called a stripe. The data block B1 of each flash drive 110_1, 110_2, 110_3, 110_4 or 110_5 is called a strip or chunk in the stripe. It is to be noted that different flash drives may allocate data blocks with similar or different block addresses for a single stripe.

In FIG. 3B, the values M and Q are equal to 5. The stripe includes the data block B1 of the flash drive 110_1, the data block B2 of the flash drive 110_2, the data block B4 of the flash drive 110_3, the data block B2 of the flash drive 110_4 and the data block B4 of the flash drive 110_5. The selection of the allocated data blocks is made according to the residual lives of the data blocks, the distribution of the stored data or other factors. For example, for a first data write operation and a second data write operation performed at different time points, the flash drive 110_2 allocates the data block B2 for the stripe in the first data write operation, but may allocate another data block for the stripe in the second data write operation even though the other flash drives allocate the same data blocks for the two stripes. The flash drive 110_2 allocates different data blocks in the first and second data write operation in view of the residual lives of the data blocks, the distribution of the stored data or other factors. The allocation rule adopted by the flash drives can be designed and adjusted to meet real requirements, and is not limited to the embodiments.

In FIG. 3C, the value M is equal to 5 and the value Q is equal to 4. Similar to the example shown in FIG. 3A, the stripe includes the data blocks B1 of the flash drives 110_1, 110_2, 110_3, 110_4 and 110_5. Nevertheless, only the data blocks B1 of the flash drives 110_1, 110_2, 110_4 and 110_5 are indeed used for storing the data, and the data block B1 of the flash drive 110_3 is unused. In this example, the intermediate data integrated by the processing unit 100 are only written into the flash drives 110_1, 110_2, 110_4 and 110_5, and the flash drive 110_3 is not subjected to the current data write operation. The data block B1 of the flash drive 110_3 is a reserved block according to the above-described definition. After the current data write operation, the residual lives of the flash drives 110_1, 110_2, 110_4 and 110_5 are shortened, while the residual life of the flash drive 110_3 is kept unchanged. Thus, the difference between the residual life of flash drive 110_3 and the residual lives of the flash drives 110_1, 110_2, 110_4 and 110_5 is changed.

In FIG. 3D, the value M is equal to 5 and the value Q is equal to 3 for this data write operation. The data block B1 of the flash drive 110_1, the data block B2 of the flash drive 110_2, the data block B3 of the flash drive 110_3, the data block B2 of the flash drive 110_4 and the data block B3 of the flash drive 110_5 are allocated for the data write operation. Nevertheless, only three actually-used data blocks are written with the data finally, i.e. the data block B1 of the flash drive 110_1, the data block B2 of the flash drive 110_2 and the data block B3 of the flash drive 110_5. The data block B3 of the flash drive 110_3 and the data block B2 of the flash drive 110_4 in the stripe are not subjected to the current data write operation and provided as the reserved blocks. After this data write operation, the residual lives of the flash drives 110_1, 110_2 and 110_5 are shortened, while the residual lives of the flash drives 110_3 and 110_4 are kept unchanged.

Please refer back to FIG. 2. Afterwards, information related to the data blocks involved in the data write operation is recorded for later access to the related data (step S218). The information may include the data storage sequence and the usage of the data blocks (e.g. which data blocks stores the application data, which data blocks stores the parity or mirror data, which data blocks are reserved blocks, etc.) in the stripe for the data write operation.

Although the data writing method is exemplified with a fixed value M, the present disclosure is not limited to the specific value. Any value M is applicable on condition that the value M should fall in the range from the minimum value required for the array design to the total number of the flash drives in the flash disk array. The intermediate data may include just the application data, or alternatively the intermediate data may include the application data and the check code (e.g. parity) derived from the application data or the mirror data of the application data. The form of the intermediate data does not affect the concept of the present disclosure and could be considered as variations of the present disclosure.

Furthermore, since the processing unit 100 processes the data write operation by considering the residual lives of the respective flash drives, a tracking program could be provided in the processing unit 100 to track, monitor and record the residual lives of the flash drives in real time. Otherwise, the specifications of the flash drives, the parameters related to the residual lives of the flash drives and/or the RAID level can be obtained at the initialization procedure so that the residual life difference can be adjusted and controlled by consideration about or calculation based on the parameters.

In conclusion, the data writing method of the flash disk array allocates a specific number of data blocks for data write operation, and then indeed writes data into several or all of the allocated data blocks according to the residual lives of the flash drives. By planned controlling of the consumption of the residual lives of respective flash drives, the data writing method can prevent the flash drives from being worn out successively within a short time.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data writing method of a flash disk array comprising a plurality of flash drives, the data writing method comprising steps of:
　　obtaining a first data quantity;
　　receiving intermediate data to be written into the flash disk array;
　　comparing a second data quantity of the intermediate data with the first data quantity; and
　　writing the intermediate data into the flash disk array when the second data quantity is not less than the first data quantity,
　　wherein the step of writing the intermediate data into the flash disk array further comprises step of:
　　　　allocating at most one data block of each of N flash drives of the plurality of the flash drives to provide M allocated data blocks constructing a stripe, wherein N and M are positive integers and M is not greater than N;
　　　　determining a number Q of actually-used data blocks and selecting Q actually-used data blocks from the M allocated data blocks of the stripe according to a predetermined rule based on adjusting residual lives of the N flash drives, wherein (M-Q) data blocks of the M allocated data blocks other than the Q actually-used data blocks are reserved blocks, Q is a positive integer and Q is not greater than M; and writing the intermediate data into the Q actually-used data blocks of the stripe collectively wherein the reserved blocks in the stripe are not written with the intermediate data,
wherein Q has at least two selectable values.

2. The data writing method according to claim 1, wherein M is determined according to a RAID level of the flash disk array.

3. The data writing method according to claim 1, wherein the intermediate data comprises application data and a check code of the application data.

4. The data writing method according to claim 1, wherein the intermediate data comprises application data and mirror data of the application data.

5. The data writing method according to claim 1, wherein the M allocated data blocks is selected from the N flash drives to adjust differences between the residual lives of the plurality of the flash drives.

6. The data writing method according to claim 1, further comprising a step of recording information related to the Q actually-used data blocks, the reserved blocks and a data storage sequence of the intermediate data after the step of writing the intermediate data into the flash disk array.

7. The data writing method according to claim 1, further comprising a step of receiving more intermediate data when the second data quantity of the intermediate data is less than the first data quantity.

8. The data writing method according to claim 1, wherein the predetermined rule based on adjusting residual lives of the N flash drives to introduce differences between the residual lives of the N flash drives is in a form of a formula, a program, firmware linked to hardware or a set of data.

9. The data writing method according to claim 1, further comprising a step of tracking the residual lives of the plurality of the flash drives wherein the Q actually-used data blocks are selected from the M allocated data blocks according to the tracked residual lives.

10. The data writing method according to claim 1, further comprising a step of obtaining parameters related to the residual lives of the plurality of the flash drives at an initialization procedure wherein the Q actually-used data blocks are selected from the M allocated data blocks according to the parameters.

* * * * *